Oct. 17, 1967

E. A. GERBER 3,348,076

PIEZOELECTRIC ACCELEROMETER

Filed May 10, 1965

INVENTOR,
EDUARD A. GERBER.

BY Harry M. Saragovitz,
Edward J. Kelly, Herbert Berl
& Julian C. Keppler

ATTORNEYS

United States Patent Office 3,348,076
Patented Oct. 17, 1967

3,348,076
PIEZOELECTRIC ACCELEROMETER
Eduard A. Gerber, West Long Branch, N.J., assignor to the United States of America as represented by the Secretary of the Army
Filed May 10, 1965, Ser. No. 454,754
2 Claims. (Cl. 310—8.4)

ABSTRACT OF THE DISCLOSURE

An electromechanical accelerometer wherein an inertial mass is held in contact with a crystal and the mass is moveable in response to acceleration of the crystal and its mounting along one or more of the axes of the crystal. Variations in the pressure applied by the inertial mass vary the frequency of the crystal with respect to the acceleration.

---

The invention described herein may be manufactured and used by or for the Government for governmental purposes without the payment of any royalty thereon.

This invention relates to accelerometers and particularly to frequency sensitive accelerometers. More particularly, this invention relates to accelerometers that will produce a highly precise change in frequency for a given change in acceleration.

The prior art includes many different types of accelerometers. The most known of these provide changes in capacity, resistance, or voltage for a given change in acceleration. The relative changes produced by the given acceleration are limited, the relative sensitivity of the means for detecting these changes caused by the acceleration are also limited, and the resulting accelerometers are correspondingly limited in sensitivity and in accuracy.

Accelerometers that use a change in the resonant frequency of a crystal for a given acceleration are also known, and the change in frequency provides a readily detectable and highly accurate means for indicating acceleration. However, the existing devices of this nature rely on a mass of heavy liquid, such as mercury, or rely on other, heavy, inertial material that effectively changes the mass of the crystal, or causes a damping effect that changes the Q of the crystal. This effect also changes with acceleration to cause uncertain accuracy and even questionable operability. Furthermore, these devices would be difficult to manufacture, and it would be difficult to reproduce the same characteristics in each sample or calibrate them.

It is therefore an object of this invention to provide an improved accelerometer that produces a change in frequency during an acceleration.

It is a further object of this invention to provide an improved accelerometer that is simple in operation, light in weight, and low in cost.

It is a further object of this invention to provide an improved accelerometer that is highly sensitive, easy to reproduce, and easy to calibrate.

It is a further object of this invention to provide an improved accelerometer that is readily adaptable to remote operation.

These and other objects of this invention are accomplished by applying a pressure, proportional to the acceleration in any given direction, to a piezoelectric crystal. The pressure is applied against one of the sensitive edges of the crystal to vary the frequency of the crystal with respect to the pressure. The change in frequency can be made to either increase or to decrease as the pressure due to acceleration is increased, or vice versa.

A pressure-sensitive, piezoelectric crystal that would be applicable here is taught in my Patent No. 3,020,423, granted on Feb. 6, 1962.

This device will be better understood, and other objects of this invention will become apparent from the following specification and the drawings, of which—

Figure 1:
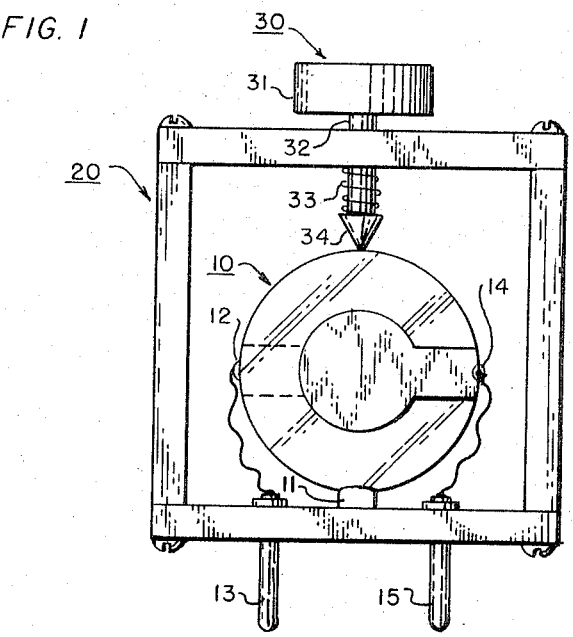
Figure 2:
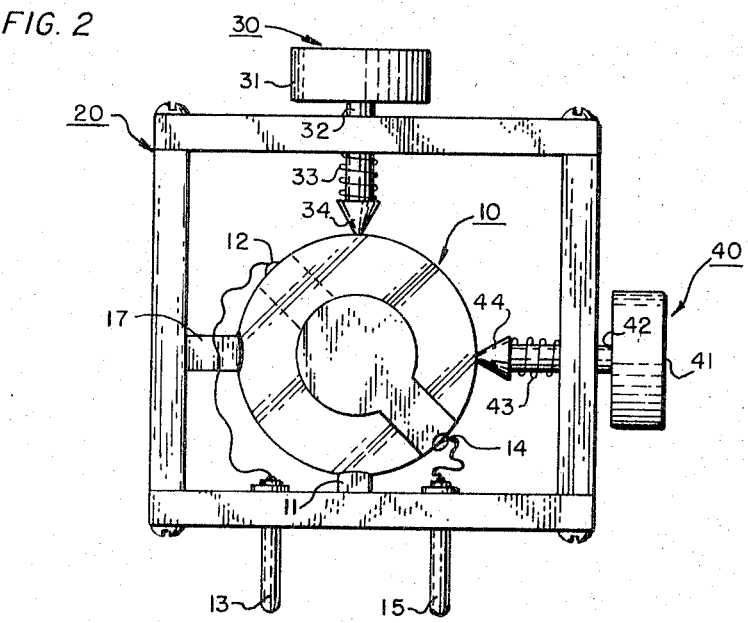

FIG. 1 is an illustration of a device having a single inertial mass for acceleration, and FIG. 2 is an illustration of a device having inertial masses effective in more than one direction.

Referring now more particularly to FIG. 1, a crystal 10 is mounted in a frame 20 by means of a bracket 11, which also supports the inertial mass 30.

The crystal has the usual electrodes 12 and 14 which connect in the usual way to contact pins 13 and 15 respectively.

The inertial mass 30 is supported by the mounting 20 but is free to move to or from the crystal 10 in a direction parallel with one of the axes of the crystal. The inertial mass 30 has the bulk of its mass 31 rigidly attached to a rod 32 which is attached to a pressure point 34 which engages the edge of the crystal. A spring 33 maintains the pressure point in a contact with the crystal in the absence of any acceleration.

FIG. 2 is similar to FIG. 1 and the similar elements are similarly numbered, but it also has an additional inertial mass 40 that is similar to the mass 30. This is supported in the frame 20 to be moveable along a different axis of the crystal, and to engage the crystal 10 at a different point along its edge.

In FIG. 2 the crystal 10 is again seen with its mounting bracket 11 securing the crystal to the frame 20. An additional mounting bracket 17, which could also be used in FIG. 1, will increase the mechanical stability of the accelerometer. The electrical connections of the crystals are the same as those of the first figure and the elements of the second inertial mass are the same as the first.

The second inertial mass 40 has the bulk of its mass 41 rigidly attached to a rod 42 which is attached to a pressure point 44 which engages the edge of the crystal. The spring 43 maintains the pressure point in contact with the crystal in the absence of any acceleration.

In operation, the pressure applied to the crystal is constant when the srystal and its holder and the inertial mass are at a state of rest or are moving at a constant velocity. When the pressure is constant the resonant frequency of the crystal remains constant. However, if there is any change in the velocity of the crystal and holder with respect to the velocity of the inertial mass, in the direction of the allowable motion of the rod through the frame, there will be a change of the pressure applied by the inertial mass on the edge of the crystal, and a corresponding change in the frequency of the crystal.

This change in the resonant frequency of a crystal with a change in the pressure on the edge of a crystal is a phenomenon that is a function of the axis of the crystal across which the pressure is applied, and, of course, the amount of pressure applied. The change may be an increase in frequency for an increase in pressure or it may be a decrease in frequency for an increase in pressure; depending on the axis of the crystal across which the pressure is applied. Conversely, the change may be an increase in frequency as the pressure is decreased, or a decrease in frequency as the pressure is decreased. This phenomenon is more completely discussed in my above-identified patent.

The means for coupling a crystal to a circuit that can utilize the resonant frequency of the crystal are well known and none is shown since there are very many circuits, and it is immaterial which of the many, available, crystal-controlled circuits is used here. The means for receiving, detecting, or indicating a change in frequency are also well known and are not shown for the same reason. Any of these well known means could be adapted, by any one skilled in the art, to this invention, and such details would, needlessly, complicate this application.

In FIG. 1, only one inertial element 30 is shown and the axis of its possible motion permits the application of pressure in one direction only. This further restricts the detection of acceleration to that direction or to a vector component of that direction.

In FIG. 2, a species is shown with inertial elements oriented to apply pressure in either or both of two directions. Since both of these directions will affect the frequency of the crystal, some change in pressure on the crystal can be had for any given change in acceleration in any direction. The combined effects can be additive or subtractive and a great many combinations of effects are possible.

The accelerometer may be oriented so that only one of the masses will be effective or it may be oriented so that both of the masses are effective. It may be oriented so that the combined effect of both masses is additive, or it may be oriented so that the combined effect of the masses is subtractive.

The masses and their directions of motions may be oriented to apply pressure at points along axes of the crystal that are at substantially right angles, as shown in FIG. 2 or at points along other axes of the crystal to achieve other effects.

This accelerometer may be positioned in a rotating body to measure centrifigal force. As a rotating device, it could have a single unit on one side of the axis of rotation with some kind of counterbalance on the other side, or it could have a single unit with two inertial masses dynamically balanced on opposite sides of an axially centered crystal to apply equal, cumulative pressures. Or, it could have one inertial mass with its axis of motion coinciding with the axis of rotation to be responsive to axial, linear, or vector acceleration of the accelerometer, as well as the other centrifugal-force measuring masses to respond to both the rotation and the vector acceleration of the unit.

Any type of crystal that will respond to pressure will be suitable for this device, although crystals that have the maximum sensitivity and are most adaptable to the necessary mountings for the applications of pressure will be most suitable.

It will be obvious to anyone skilled in the art that accelerometers such as these can be used in many combinations with multiple crystals and variable masses and directions of motion to respond to acceleration in as many directions and in various ways. Such compound units can be responsive to acceleration in three dimensions.

It will also be obvious, where multiple crystals are used, that each crystal can have a separate frequency to permit a remote indication of the actual direction of acceleration of the body with respect to its frame.

One of the particular advantages of the accelerometer, for almost any use, is that the acceleration information is provided in a highly usable form. It can be transmitted directly from the accelerometer itself—by present-day, minaturized elements—to a remote receiver with no transducing of one function to another and no wiring or other electrical or mechanical problems.

What is claimed is:

1. An accelerometer comprising a piezoelectric crystal having opposing surfaces and a peripheral edge; a first and second electrodes contacting said opposing surfaces of said crystal; a mounting frame; a mounting bracket connecting said crystal to said mounting frame; a first and second electrical terminals projecting from said mounting frame; means for connecting said first terminal to said first electrode; means for connecting said second terminal to said second electrode; a first inertial mass movably mounted in said frame, one portion of said first inertial mass making contact with said crystal at a first point along said peripheral edge of said crystal, said first inertial mass having a direction of motion parallel to one of the axes of said crystal; and a second inertial mass, movably mounted in said frame; one portion of said second inertial mass making contact with said crystal at a second point along said peripheral edge of said crystal, said second inertial mass having a direction of motion parallel to one of the axes of said crystal.

2. An accelerometer comprising a piezoelectric crystal having opposing surfaces and a peripheral edge; a first and second electrodes contacting said opposing surfaces of said crystal; a mounting frame; a mounting bracket connecting said crystal to said mounting frame; a first and second electrical terminals projecting from said mounting frame; means for connecting said first terminal to said first electrode and said second terminal to said second electrode; and a plurality of inertial masses movably mounted in said mounting frame, one portion of each of said masses making contact with said crystal at a separate point along said peripheral edge, and each of said inertial masses having a separate direction of motion parallel to one of the axes of said crystal.

References Cited

UNITED STATES PATENTS

| 1,902,184 | 3/1933 | Rieber | 310—8.4 |
| 2,371,626 | 3/1945 | Kecskemeti | 310—8.4 |
| 2,487,035 | 11/1949 | Weaver | 310—8.4 |
| 2,828,118 | 3/1958 | Lavender | 310—8.4 |
| 2,963,911 | 12/1960 | Pratt | 310—8.4 |
| 3,102,963 | 9/1963 | Gerber | 310—9.1 |
| 3,186,237 | 6/1965 | Forrest | 310—8.4 |

FOREIGN PATENTS

| 747,008 | 1/1944 | Germany. |
| 909,257 | 7/1949 | Germany. |

MILTON O. HIRSHFIELD, *Primary Examiner.*

J. D. MILLER, *Examiner.*